US009968075B2

(12) United States Patent
Engel

(10) Patent No.: US 9,968,075 B2
(45) Date of Patent: May 15, 2018

(54) HONEYCOMB CUTTING APPARATUS AND HONEY COLLECTION SYSTEM

(71) Applicant: REVOLUTIONARY BEEKEEPING LIMITED, Masterton (NZ)

(72) Inventor: Grant Errol Engel, Kerikeri (NZ)

(73) Assignee: REVOLUTIONARY BEEKEEPING LIMITED, Masterton (NZ)

( * ) Notice: Subject to any disclaimer, the term of this patent is extended or adjusted under 35 U.S.C. 154(b) by 0 days. days.

(21) Appl. No.: 14/772,577

(22) PCT Filed: Mar. 4, 2014

(86) PCT No.: PCT/NZ2014/000025
§ 371 (c)(1),
(2) Date: Sep. 3, 2015

(87) PCT Pub. No.: WO2014/137225
PCT Pub. Date: Sep. 12, 2014

(65) Prior Publication Data
US 2016/0000050 A1    Jan. 7, 2016

(30) Foreign Application Priority Data

Mar. 4, 2013  (NZ) ........................ 607812

(51) Int. Cl.
*A01K 59/02* (2006.01)
*A01K 47/06* (2006.01)
*A01K 59/04* (2006.01)

(52) U.S. Cl.
CPC ............. *A01K 59/02* (2013.01); *A01K 47/06* (2013.01); *A01K 59/04* (2013.01)

(58) Field of Classification Search
CPC ......... A01K 59/00; A01K 59/02; A01K 47/06
USPC .................. 449/5, 35, 36, 41, 51, 53, 54, 63
See application file for complete search history.

(56) References Cited

U.S. PATENT DOCUMENTS

| 249,881 | A | | 11/1881 | Bourgmeyer | |
| 731,701 | A | * | 6/1903 | Miller | A01K 59/02 |
| | | | | | 449/63 |
| 1,084,141 | A | * | 1/1914 | Ferguson | A01K 59/02 |
| | | | | | 294/115 |
| 1,426,551 | A | | 8/1922 | Cress, Jr. | |
| 1,584,392 | A | | 5/1926 | Markle et al. | |
| 1,776,739 | A | | 9/1930 | O'Brien | |
| 1,881,354 | A | | 10/1932 | Everett | |
| 2,168,579 | A | | 8/1939 | Perreton | |
| 2,448,986 | A | | 9/1948 | Ladwig | |
| 2,604,643 | A | | 7/1952 | Hamilton | |

(Continued)

FOREIGN PATENT DOCUMENTS

| EP | 0509955 | 10/1992 |
| EP | 2314156 | 4/2011 |

(Continued)

*Primary Examiner* — Lisa L Tsang
(74) *Attorney, Agent, or Firm* — Dann, Dorfman, Herrell & Skillman, P.C.

(57) ABSTRACT

An apparatus for cutting honeycomb from a honey frame comprising a frame with an opening for inserting a honey frame and at least one blade supported by the frame. The at least one blade is adapted to pivot between a first position where a honey frame can be inserted into the opening and a second position where the blade will cut the honeycomb.

12 Claims, 12 Drawing Sheets

(56) References Cited

U.S. PATENT DOCUMENTS

| | | | |
|---|---|---|---|
| 2,631,307 A * | 3/1953 | Sugano | A01K 59/00 |
| | | | 449/5 |
| 2,807,034 A | 9/1957 | Fox | |
| 3,068,496 A | 12/1962 | Owens | |
| 3,091,780 A | 6/1963 | Smithson | |
| 3,204,500 A | 9/1965 | Lincoln | |
| 3,293,672 A | 12/1966 | Gregersen | |
| 3,394,426 A | 7/1968 | Knox | |
| 3,735,433 A | 5/1973 | Smith | |
| 3,737,931 A | 6/1973 | Hodgson | |
| 4,195,379 A | 4/1980 | Krasnik | |
| 4,280,236 A * | 7/1981 | Herman | A01K 59/00 |
| | | | 449/12 |
| 4,328,743 A | 5/1982 | Fager | |
| 4,372,000 A * | 2/1983 | Hurd | A01K 47/02 |
| | | | 449/43 |
| 4,520,519 A | 6/1985 | Kuehl | |
| 4,678,569 A | 7/1987 | Cunningham | |
| 6,193,583 B1 | 2/2001 | Gunness | |
| 7,063,592 B2 | 6/2006 | Pointer | |
| 7,985,118 B2 | 7/2011 | Bermel | |
| 2007/0232189 A1 | 10/2007 | Hamby | |
| 2009/0227180 A1 | 9/2009 | Papalia | |
| 2010/0261409 A1 | 10/2010 | Bermel | |

FOREIGN PATENT DOCUMENTS

| | | | | |
|---|---|---|---|---|
| ES | 2338745 | | 5/2010 | |
| GB | 482237 | | 3/1938 | |
| GB | 592090 A | * | 9/1947 | A01K 47/02 |
| KR | 1556288 | * | 3/2016 | |
| WO | WO 03047337 A1 | * | 6/2003 | A01K 59/00 |
| WO | 2004054353 | | 7/2004 | |
| WO | 2012114136 | | 8/2012 | |

* cited by examiner

HONEYCOMB CUTTING APPARATUS AND HONEY COLLECTION SYSTEM

FIELD OF THE INVENTION

The invention relates to an apparatus and method for removing honeycomb from honey frames.

BACKGROUND

Traditional honey frames have a solid outer frame and an internal region where honeybees build their honeycomb cell structure to fill with honey.

A traditional method of collecting honeycomb includes removing honey frames from a honey super in a beehive and transporting those frames away from the hives to a processing facility where the honey can be extracted from the honeycomb. However, transportation of honey frames is a labourious exercise because: effort is required to manoeuvre the heavy filled honey frames to a vehicle, frames must be transported to a remote processing facility, and the processed honey frames must be returned to the beehives.

It is an object of the present invention to provide an improved method of collecting honey and/or an improved apparatus for collecting honey which overcomes or at least ameliorates some of the abovementioned disadvantages or which at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

In one aspect the invention may broadly be said to consist in an apparatus adapted to cut honeycomb from a honey frame comprising an enclosure having an upper portion defining an opening and a lower portion adapted to reside atop a collection apparatus, a blade located proximate the opening having a cutting surface, the blade defining a first region of the opening where a honey frame is to be inserted and a second region of the opening where cut honeycomb is to fall, and wherein the blade is inclined in a direction toward the first region.

According to a further aspect the invention may broadly be said to consist an apparatus adapted to cut honeycomb from a honey frame comprising an enclosure having an upper portion defining an opening and a lower portion adapted to reside atop a collection apparatus, a blade assembly located proximate the opening and comprising at least a first and a second opposing blade, each having a cutting surface, and wherein at least the first blade is pivotable, relative to a second blade, between at least a first position, where at least one blade is pivoted into a first configuration where the cutting surfaces are distal, and a second position, where at least one blade is pivoted into a second configuration where the cutting surface are proximate.

According to a further aspect the invention may broadly be said to consist in an apparatus adapted to cut honeycomb from a honey frame comprising an enclosure having an upper portion defining an opening and a lower portion adapted to reside atop a collection apparatus, an arrangement of opposing blades, supported by the enclosure, comprising at least first and second opposing blades, each blade having a cutting surface, the first blade arranged to contact one face of a honey frame and the second blade arranged to contact an opposing face of the honey frame, wherein the blades are moveable between a first position where a honey frame can be inserted, and a second position where the blades engage with the honey frame.

According to a further aspect the invention may broadly be said to consist in an apparatus adapted to cut honeycomb from a honey frame comprising an enclosure having an upper portion defining an opening and a lower portion adapted to reside atop a collection apparatus, an arrangement of opposing blades, supported by the enclosure, comprising at least first and second opposing blades, each blade having a cutting surface, the first blade arranged to contact one side of a honey frame and the second blade arranged to contact an opposing side of the honey frame, the blades having an insertion and a cutting position, wherein in the insertion position, the blades are inclined and outwardly tilted to form a first ∥ like shape, and wherein in the cutting position, the blades are inclined and inwardly tilted to form a ∧ like shape.

According to a further aspect the invention may broadly be said to consist in an apparatus for cutting honeycomb from a honey frame comprising a frame having an opening for inserting a honey frame, and at least one blade supported by the frame and wherein the at least one blade is adapted to pivot between a first position where a honey frame can be inserted into the opening and a second position where the blade will cut the honeycomb.

According to a further aspect the invention may broadly be said to consist in an apparatus adapted to cut honeycomb from a honey frame comprising a frame having an upper portion defining an opening and a lower portion adapted to reside atop a collection apparatus, an arrangement of opposing blades, supported by the enclosure, comprising at least first and second opposing blades, each blade having a cutting surface, the first blade arranged to contact one side of a honey frame and the second blade arranged to contact an opposing side of the honey frame, the blades having an insertion and a cutting position, wherein in the insertion position, the blades are inclined and outwardly tilted to form a first ∥ like shape, and wherein in the cutting position, the blades are inclined and inwardly tilted to form a ∧ like shape.

According to a further aspect the invention may broadly be said to consist in a method of using the apparatus as claimed in any preceding claim, wherein the method comprises the steps of moving one or more blades into an outward position, inserting a honey frame, containing honeycomb, proximate the one or more blades, moving one or more blades into contact with the honeycomb to provide a cutting action, forcing the honey frame downward so as to cause a cutting action that severs the honeycomb from the honey frame.

According to a further aspect the invention may broadly be said to consist in a method of using the apparatus as claimed in any preceding claim, wherein the method comprises the steps of removing a honey frame from a bee hive, cutting honeycomb the honey frame according to the apparatus of any preceding claim, collecting honeycomb cut from the honey frame in a collection apparatus, and placing the honey frame back into the bee hive.

Preferably the apparatus further comprises a support or supporting wall supported by the frame and opposing the blade, the supporting wall adapted to press against the honeycomb or honey frame when the blade is in the second position.

In some embodiments the at least one blade comprises a first blade and the support or supporting wall comprises at least a second blade arranged to oppose the first blade.

In some embodiments the second blade is adapted to pivot between the first position where a honey frame can be inserted between the first and second blades and the second position where the first and second blades will cut the honeycomb.

In some embodiments the first and/or second blades are supported by the frame by one or more support members.

In some embodiments the one or more support members are rotationally supported by the frame.

In some embodiments the frame comprises an enclosure and side walls, the enclosure adapted to be fastened to the side walls by one or more fasteners.

In some embodiments at least one of the sidewalls or enclosure is adapted to engage with the collection apparatus.

In some embodiments the first blade is adapted to contact a first face of the honey frame and the second blade is adapted to contact a second face, opposite the first face.

In some embodiments the enclosure comprises at least two opposing walls.

In some embodiments the first and second blades are respectively supported by a first and a second support member adapted to span between the at least two opposing walls.

In some embodiments the first and second blades further comprise a mounting surface.

In some embodiments the mounting surface is attached or is attachable to a supporting member by one or more fastening devices.

In some embodiments the blades are arranged to allow insertion of the honey frame between the upper and inward edges.

In some embodiments the first blade is pivotable and the second blade is fixed.

In some embodiments the lower portion of the enclosure or frame is profiled to allow engagement with a collection apparatus.

In some embodiments one or more blades are heated by any one or more of an electrical element or a hot fluid.

In some embodiments one or more blades has coupled, directly or indirectly, a handle adapted to provide leverage to the one or more blades.

In some embodiments the apparatus further comprises a biasing device connecting the handle to the enclosure or frame, the biasing device configured to bias the handle to an inward or cutting position.

In some embodiments the apparatus further comprises a lid adapted to substantially cover the opening.

In some embodiments the apparatus further comprises a coupling arm connecting a lid adapted to substantially cover the opening to the handle wherein the coupling arm has a point of articulation.

In some embodiments the device resides atop a collection apparatus.

According to a further aspect the invention may broadly be said to consist in a method of using the apparatus, wherein the method comprises the steps of:
  removing a honey frame from a bee hive,
  cutting honeycomb from the honey frame,
  collecting honeycomb cut from the honey frame in a collection apparatus, and
  placing the honey frame back into the bee hive.

In some embodiments the method further comprises transporting the honeycomb to a honey processing facility.

According to a further aspect the invention may broadly be said to consist in a system for collecting honey comprising:
  providing at least one the apparatus of any above statement to one or more users to collect honey by way of:
  leasing the apparatus to one or more users,
  selling the apparatus to one or more users,
  allowing supervised use of the apparatus by one or more users,
  arranging use of the apparatus by a club wherein the one or more users belong to that club, and/or
  receiving remuneration from the one or more users for return of the apparatus, and one or more of:
  receiving honey collected by the apparatus,
  remunerating the one or more users for collecting honey,
  remunerating the one or more users for freighting collected honey,
  remunerating the one or more users for freighting collected honey to a honey processing facility, and/or
  remunerating the one or more users for freighting collected honey to a predetermined location.

According to a further aspect the invention may broadly be said to consist in a system for collecting honey comprising:
one or more apparatus for cutting honeycomb from a honey frame claimed in any above statement to one or more users to collect honey,
a honey processing facility, and
wherein the one or more apparatus is provided to one or more users in exchange for one or more of:
  receiving honey collected by the apparatus,
  remunerating the one or more users for collecting honey,
  remunerating the one or more users for freighting collected honey,
  remunerating the one or more users for freighting collected honey to the honey processing facility, and/or
  remunerating the one or more users for freighting collected honey to a predetermined location.

In some embodiments the method comprises the steps of:
providing the apparatus to one or more users,
receiving honey collected by the one or more users, and
remunerating one or more users in exchange for the honey collected.

In some embodiments the method further comprises processing the honey collected at a honey processing facility.

In some embodiments the method comprises the steps of:
cutting honeycomb from a the honey frame,
transporting the honeycomb to a honey processing or storage facility.

According to a further aspect the invention may broadly be said to consist in a system for managing honey collection comprising:
providing the apparatus of any above statement to one or more users,
a database configured to store data pertaining to:
  one or more users undertaking the method according to any above statement,
  data relating to honey collected by the one or more users,
wherein the database is updated at least when honey collected using the apparatus is received from one or more users.

According to a further aspect the invention may broadly be said to consist in a system for managing honey collection wherein data comprises one or more of:
  a quantity of bee hives,
  identification of the user of the apparatus,
  a quantity of honey collected, the location where the apparatus has been used,
the time spent with the apparatus, and/or
the time when the honey was collected.

According to a further aspect the invention may broadly be said to consist in a method of collecting honey comprising: to each of a plurality of users operating beehives, providing one or more apparatus of any above statement, receiving, from two or more of the users, honey collected from their beehives using the apparatus, at one or more bulk honey facilities.

In some embodiments the method further comprises storing, processing, packaging, distributing, and/or trading the honey received at one or more of the bulk honey facilities and/or otherwise dealing with the honey received at the one or more bulk honey facilities.

The following embodiments may relate to any of the above aspects. Other aspects of the invention may become apparent from the following description which is given by way of example only and with reference to the accompanying drawings.

As used herein "(s)" following a noun means the plural and/or singular forms of the noun.

The term "and/or" means "and" or "or", or both.

The term "comprising" as used in this specification means "consisting at least in part of". When interpreting statements in this specification which include that term, the features, prefaced by that term in each statement or claim, all need to be present but other features can also be present. Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention will now be described by way of example only and with reference to the drawings in which.

DETAILED DESCRIPTION

Conventional methods of collecting honeycomb involve removing honey frames from a bee hive and transporting them to processing facility at some distant location. In the processing facility, the honey is removed from the honey frames. A disadvantage of this conventional method lies with the requirement for transportation of the honey frames to a distant location. Honey frames containing honeycomb are often very heavy and require a significant amount of labour to be loaded into a vehicle for transportation. Further, the honey frames, once stripped of honey at the processing facility, must be transported back to the location of the bee hive and replaced, which requires more time and energy.

The invention is an apparatus that is easily transportable to the location of a bee hive so that honey frames can be stripped of honey without requiring them to be removed from the site of the hive. The invention is also a method of collecting honey. The invention may also relate to a method of using the apparatus as part of a system.

Figure 1:
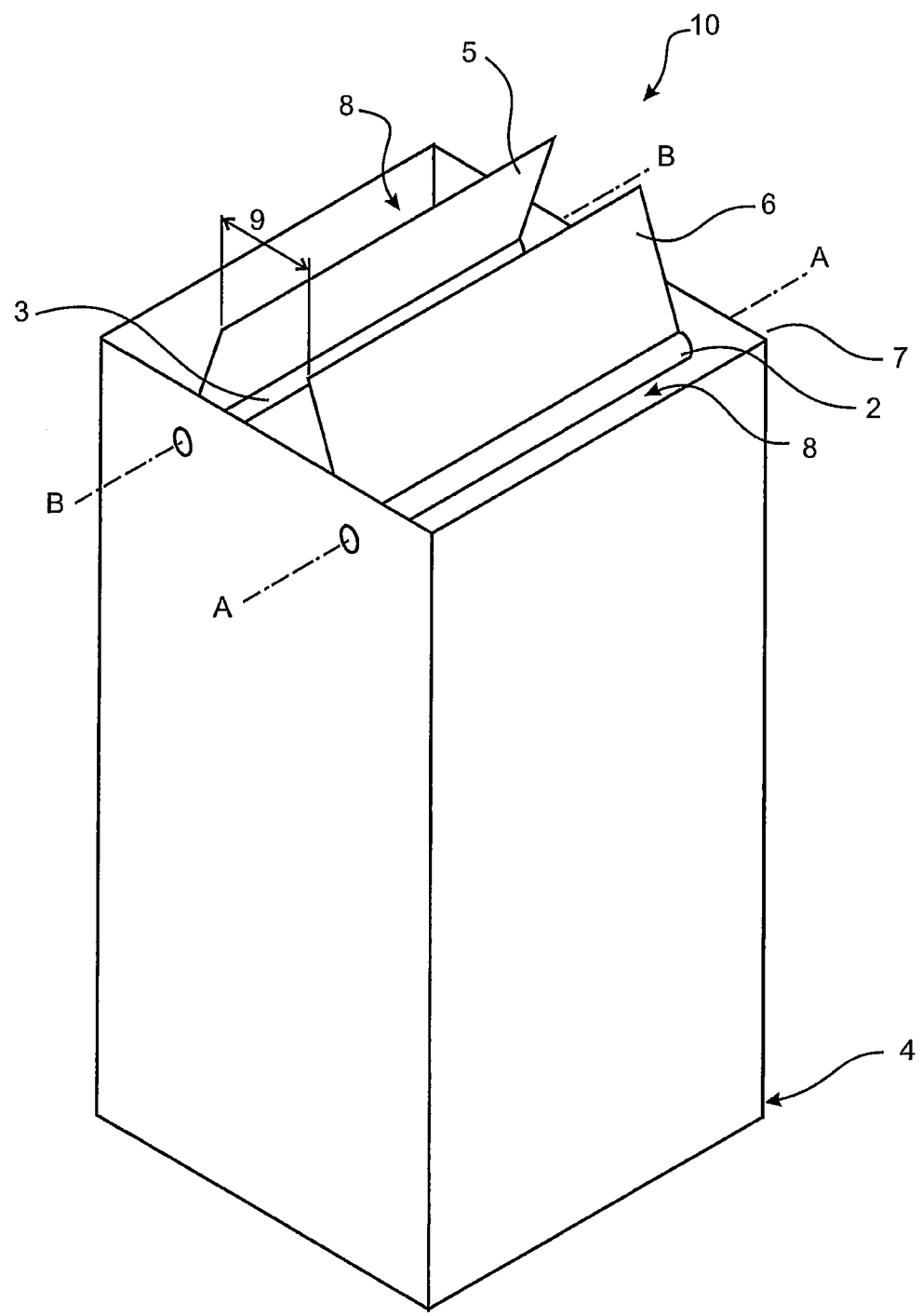
FIG. 1 shows a perspective view of an apparatus according to one embodiment of the invention.
Figure 9:
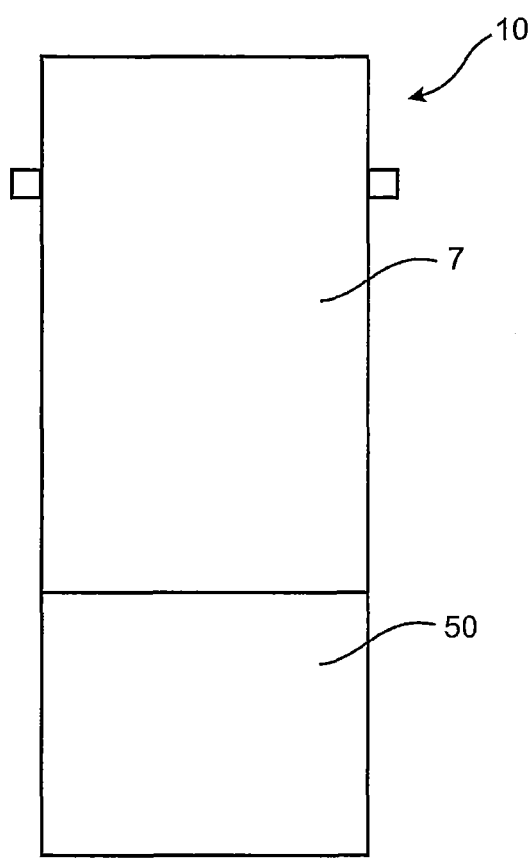
FIG. 9 shows a side view of the apparatus on top of a collection apparatus according to any embodiment.

FIG. 1 shows an apparatus 10 having an outer frame or walls 7 comprising a number of sidewalls that form an enclosure for a blade assembly. Referring to FIG. 9, when in use, the frame 7 is preferably perched on top of a collection apparatus such as a food grade bucket. Honey frames freshly removed from a hive have the honey and honeycomb cut from the honey frames. The honey frames can then be returned straight to the hive without having to be removed from the site of the hives. The collection apparatus collects the honey and honeycomb material dislodged from the honey frame.

Figure 4:
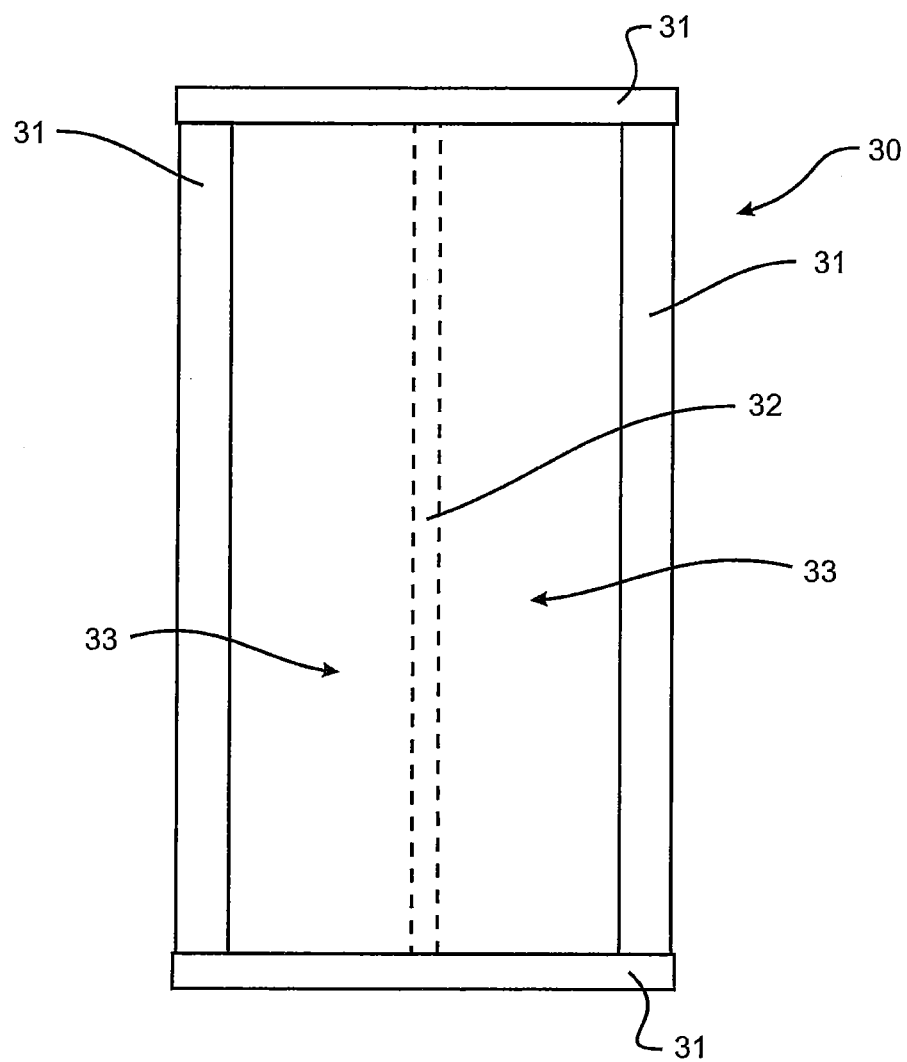
FIG. 4 shows a cross sectional view of one example of a honey frame suitable for use with the invention.

FIG. 4 shows a cross sectional view of one example of a honey frame 30 suitable for use with the apparatus. The honey frame preferably comprises an outer frame 31 formed from a plastic material. However, wooden members may form part or the entire outer frame. In the centre of the frame is a dividing wall 32 which is the surface on which bees begin to construct their honeycomb. The outer frame preferably consists of upper, lower and side frame members that encapsulate the dividing wall 32. To promote engagement of the bees to construct the honeycomb, the wall 32 may have a surface contour or texture which also resembles a honeycomb structure. The honey frame 30 has a pair of interior regions 33 either side of the wall 32 where the honeycomb is outwardly built by the bees. The apparatus allows the honeycomb and honey to be removed from the interior regions 33 and severed from the internal wall 32.

Referring again to FIG. 1, the blade assembly is preferably located at the upper region of the frame 7. In preferred embodiments the blade assembly includes at least two opposing blades. Preferably a first blade is orientated so that a cutting edge will contact one face of a honey frame 30 and the cutting edge of another blade is orientated to contact the opposing face of the honey frame. However, alternative embodiments containing a single blade may also be employed and will be later discussed.

In the preferred embodiment, a first blade 5 is rigidly fixed to a supporting member 3 which is in turn rigidly supported within the frame 7. The first blade 5 has an incline such that a surface is provided that slopes upwardly in a direction from the supporting member 3. A second blade 6 is mounted to a second supporting member 2. The second blade 6 is pivotable relative to the first blade such that there is an adjustable separation gap 9 between the edges of the first and second blades. The second blade 6 is pivotable about the axis A-A of the support member 2.

In use, the second bade is pivoted between at least a first position, known as an insertion position, where the gap 9 is sufficient to allow a honey frame to be inserted and a second position, known as a cutting position, where the gap 9 is closed such that the blades 5, 6 can cut into the honeycomb within the frame.

In another embodiment, the first blade 5 is attached to a supporting member 3 which is in turn pivotally supported within the frame 7. The first blade 5 is pivotable to provide a range of inclination angles an incline such that a surface is provided that slopes upwardly in a direction from the supporting member 3. A second blade 6 is mounted to a second supporting member 2. Preferably the first blade 5 and second blade 6 are pivotable such that there is an adjustable separation gap 9 between the edges of the first and second blades. Preferably the first blade 5 is pivotable about the axis B-B of the support member 3. Pivoting blades are preferably maneuvered into position by hand.

In use, the first and second blades are pivoted between at least a first or insertion position where the gap 9 is sufficient to allow a honey frame 30 to be inserted and a second or cutting position where the gap 9 is closed such that the blades 5, 6 can cut into the honeycomb within the frame.

Figure 2A:
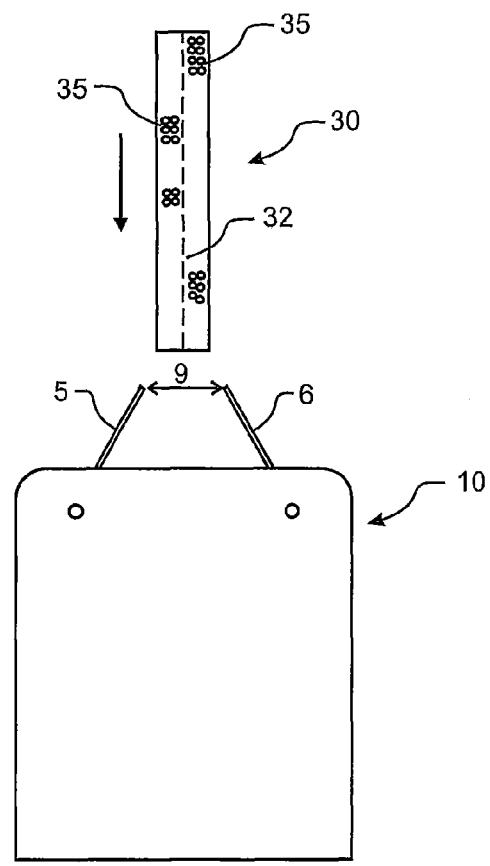
FIGS. 2(a) and 2(b) show a side view of the apparatus and a honey frame containing honey comb.
Figure 2B:
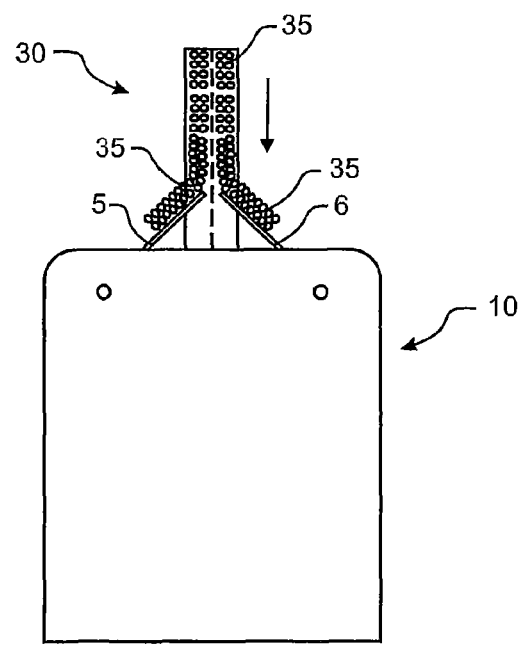

FIG. 2(a) shows a side view of the apparatus 10 and a honey frame 30 containing honeycomb 35 and honey that, for example, has been freshly removed from a bee hive. The honey frame 30 is positioned above the blades 5, 6 of the apparatus 10. The blades 5, 6 are adequately separated, by virtue of the first and/or second blades being pivoted outward to increase the gap 9 sufficiently, to allow the honey frame 30 to be positioned between them. Preferably the blades perform a cut into the honeycomb to the dividing wall 32 by pivoting one or both blades inwardly. The blades preferably penetrate beneath the layer of honeycomb to meet either side at or substantially close to the dividing wall 32 such as shown in FIG. 2(b). The honey frame 30 may then be forced downward and through the blades in the direction indicated by the arrows, for example, by hand. The honey frame is pressed down until an edge, for example the top edge, of the frame 31 engages the blades.

The blades cut between the face of the dividing wall 32 and the honeycomb as the honey frame is forced between the blades. The honeycomb 35 is stripped from the dividing wall of the honey frame and slides across the upper surface of the blades and falls through the gap 8 between the outer blade edge and the walls 7. The honeycomb 35 preferably falls to the bottom of the apparatus 7 and into a collection apparatus located below (which is described below).

The upward and inward inclination of the blades facilitates active retention in the cutting position as the honey frame is being forced downward. The blades are biased inwardly by virtue of their inward slant and the downward force of the honeycomb pressing upon the top surface. The blades may then be separated by pivoting on or both outwardly so that the honey frame 30 can be removed from the confines of the apparatus 10. When the honeycomb frame is lifted from the blades the blades are no longer being pressed on from above and are free to pivot outwardly or may be pivoted outwardly by hand.

The frame 7 is preferably shaped so that the lower region 4 will engage the collection apparatus 50 (see FIG. 9) with a snug yet easily releasable fit. The engagement is preferably one where bees are prevented from pass there between yet the frame can easily be lifted without much or any effort required to separate the frame from the collection apparatus.

Figure 6:
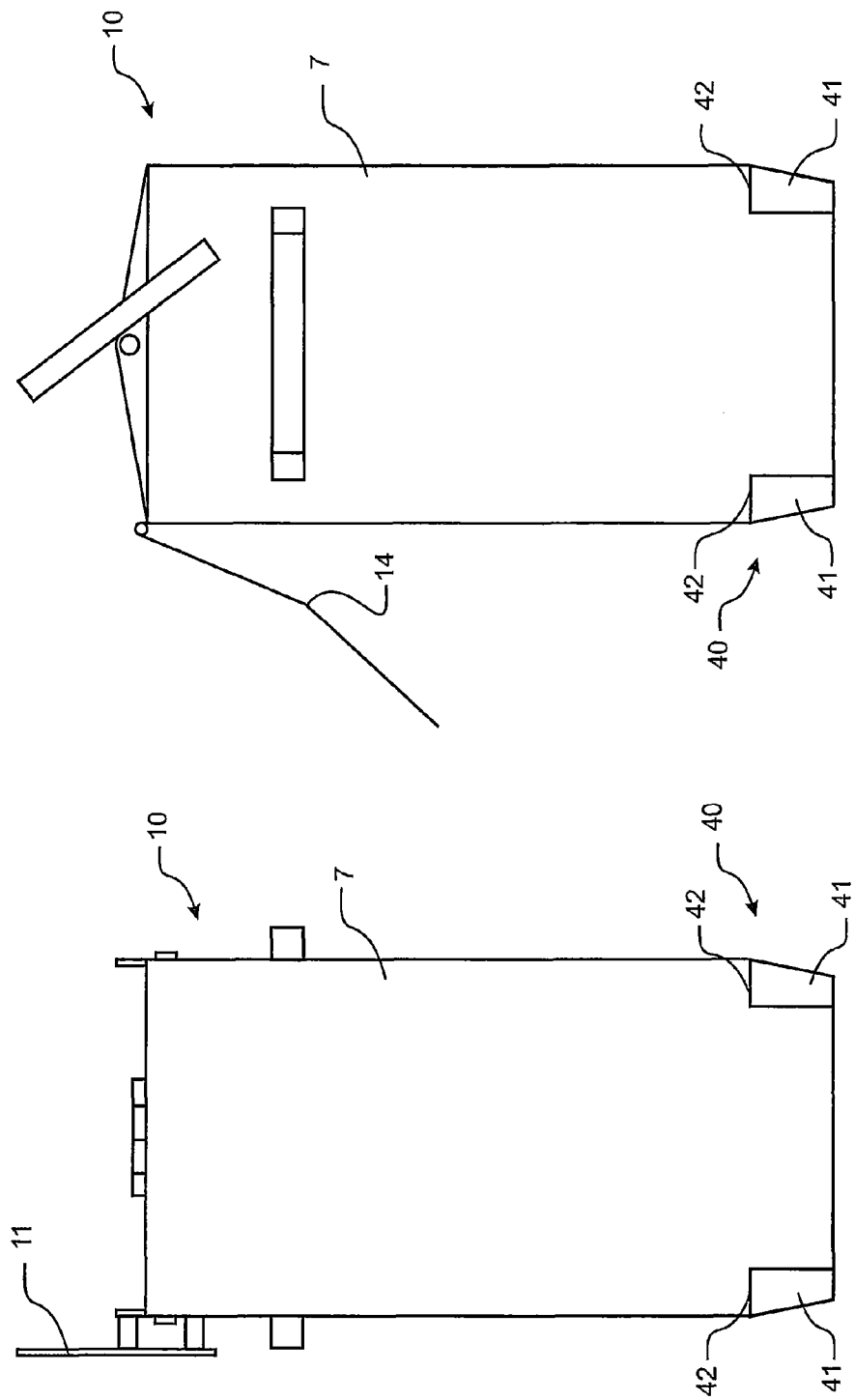
FIGS. 6(a) and 6(b) show side profiles of the apparatus according to the embodiment of FIG. 5.

FIGS. 6(a) and 6(b) show one possible option where side profiles of the apparatus 10 and in particular show a lower region of the sidewalls that optionally incorporate an inward taper 40 to help location atop the collection apparatus 50 and/or optionally incorporate recessed portions 41 that may engage with corners of the collection apparatus 50. The taper 40 and/or the upper wall 42 of the recess 41 prevent the apparatus 10 from sinking too far into a collection apparatus to ensure that it can be easily removed again.

Optionally the lower region is shaped to provide recessed corner portions which provide a seating surface that stabilises the frame 7 atop of the collection apparatus. FIG. 9 shows the apparatus 10 on top of the collection apparatus 50. The collection apparatus 50 is positioned below the blades to catch falling honeycomb that has been cut from the frame.

The apparatus may then be removed from atop the collection apparatus and the opening of the collection apparatus 50 sealed. The sealed collection apparatus containing the honeycomb may then be transported from the site of the beehives and the honey extracted from the honeycomb by any appropriate method.

In some embodiments, a heating device may be applied to or integrated within one or more cutting blades. Appropriate heating devices include electric elements or the application of hot fluids. Electrical elements could be powered by, for example, the battery in a nearby vehicle. Heating the blades provides faster and smoother cutting action through the honeycomb by reducing the viscosity of the surrounding honeycomb and therefore the friction. Heated blades may advantageously lower the processing time and the force required to cut honeycomb from a honey frame.

Figure 3:
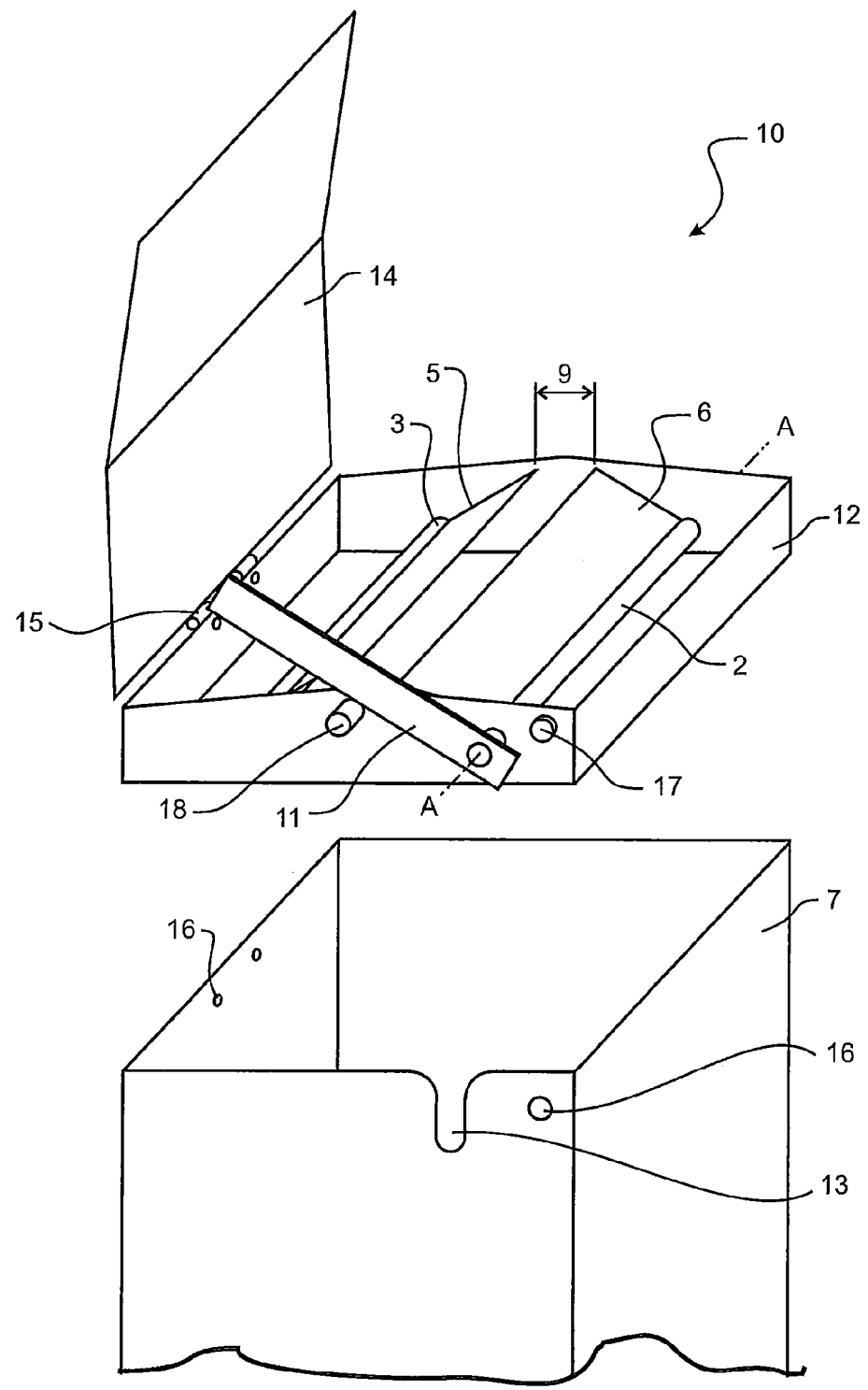
FIG. 3 shows a perspective view of an apparatus according to another embodiment of the invention incorporating further optional features.

FIG. 3 shows a perspective view of another embodiment incorporating further optional features. The blade assembly may be incorporated into the sidewalls of the device or alternatively, as shown, supported by an enclosure or subassembly 12 that can reside on the upper surface of the apparatus wall 7 or some other appropriate support. Provision of the blade and support assembly separate from the apparatus wall 7 allows these components to be easily separated for cleaning purposes and component interchange ability. For example, blade assemblies with differing dimensions could be installed to suit different sized honey frames. Blades may further be detachable from the support mechanisms to facilitate cleaning of the components.

In the embodiment of FIG. 3, the first blade 5 is attached to the support 3 which is in turn fixed to the interior of the enclosure 12. The second blade 6 is attached to the second support 2 and is allowed to pivot. The pivoting mechanism may be, for example, a round support 2 rotating about axis A-A in a round hole appropriately positioned in the side of the enclosure 12.

A handle 11 is provided to improve control of the rotation of the pivotable blade 6 and adjust the separation gap 9 between the first and second blades. The handle 11 also provides improved leverage and may be used to force the pivotable blade 6 into a honeycomb and against the opposing blade 5 to initiate a cutting action.

A stop 18 is provided in the sidewall of the enclosure 12 and within the arc of movement of the handle about the rotation axis A-A such that the handle can contact the stop during rotation. The stop may be provided to limit the inward rotation of the handle, and therefore the blade 6, to prevent inadvertent cutting of the honey frame. Preferably the stop is positioned according to the desired depth of the cut to be made into the honeycomb. A user may grasp the handle and force the blades the cutting position where the honeycomb is cut by the blades, while relying on the handle contacting the stop 18 to limit movement of the blade beyond a safe limit.

A recess 13 is preferably provided in the apparatus walls 7 to allow for the handle 11 and supporting shaft 2 to reside. One or a plurality of fasteners 17 with complimentary apertures 16 may be provided to lock the enclosure 12 to the walls 7.

A lid 14 is preferably attached to the top of the enclosure 12 or the device walls 7 by way of a hinge 15. The lid 14 allows a user to close the top of the apparatus 10 to prevent bees or other debris from entering the interior when not being attended. For example, when a honey frame is stripped of honeycomb, the lid may be closed while the stripped honey frame is returned to the hive and a new honeycomb is retrieved.

In use, the enclosure 12 can be placed on top of the walls 7 of the apparatus and the assembly fastened together by making use of the fastening holes 16 and fasteners 17. The fastened assembly is position on a collection apparatus 50 and honey frames can be inserted between the blades 5, 6 where honeycomb can be cut from the frame according to the action described above.

Figure 5:
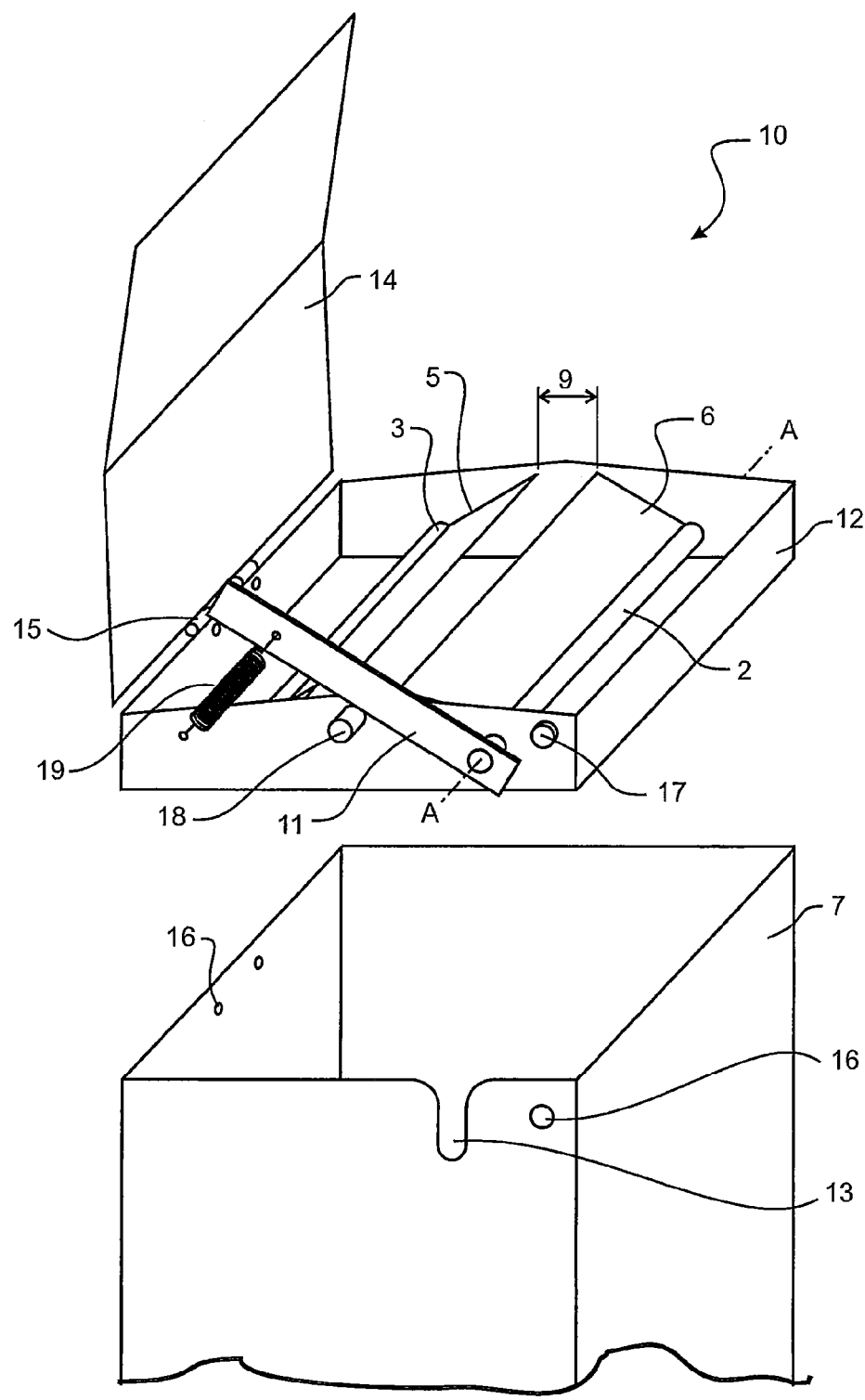
FIG. 5 shows an apparatus according to a further embodiment of the invention.

FIG. 5 shows a further embodiment where at least one of the blades 5, 6 is biased inwardly by biasing device 19 such as a coil spring. The biasing device is connected between the handle 11 and preferably the frame 7 to provide a compressive force. The biasing device 19 allows the handle 11 to be used to open the cutting blades to insert a honey frame. When the handle is released, one or more blades will be pulled inward to cut the honeycomb on the honey frame and held in the cutting position. The stop 18 may limit the extent of which the biasing device can move the blade.

Figure 7:
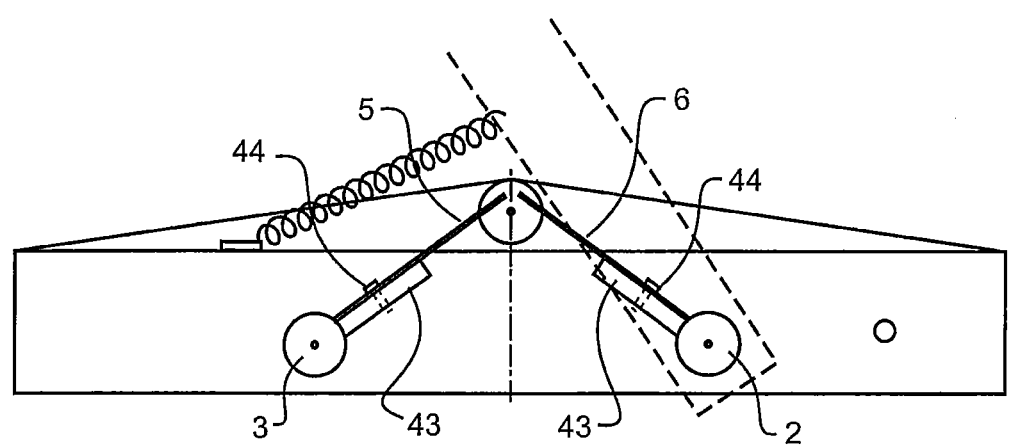
FIG. 7 shows a cross sectional side view of the embodiment of FIGS. 5 and 6.
Figure 8:
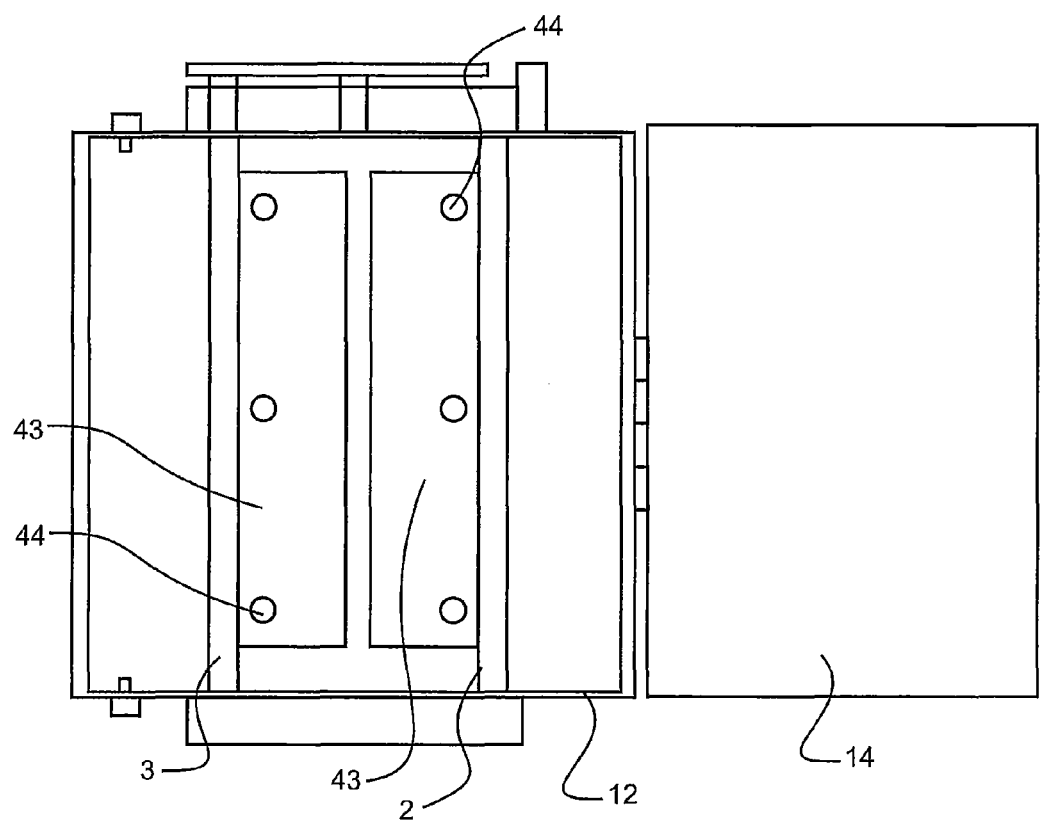
FIG. 8 shows a top view of the apparatus with blades removed as may apply to any embodiment.

FIG. 7 shows a cross sectional side view of another embodiment and in particular shows the support members 2, 3 having blacking plates 43 that support the blades 5, 6. The blacking plates are preferably shaped to allow a range of blades to be attached by way of a fastener 44. FIG. 8 shows a top view of the device 10 where the blades are removed and the backing plates 43 are clearly shown with fastening apertures 44. However, any appropriate releasable attachment between the blades and the backing plates could be used.

In another embodiment preferably incorporate a single blade for is arranged within the walls 7 of the apparatus 10. The blade is arranged such that is will engage one side of a honey frame while a supporting wall or similar component is preferably provided on the opposing side of the frame to the blade to allow the frame to be pressed against for leverage. In a further variation, the blade could be angled downward and the honey frame arranged to be pulled upward and against the blade. In each single blade embodiment, the blade forced between the honeycomb and the dividing wall 32 such that the honeycomb is cut from the frame. To facilitate the blade cutting into the honeycomb, the blade may be pivotable by way of being fixed to a rotational support member as described above. The blade may be rotated into a cutting position by pivoting it away from the support such that a honey frame can be inserted. The blade may then be pivoted into a cutting position to close the gap and cut into the honey frame.

Figure 10:
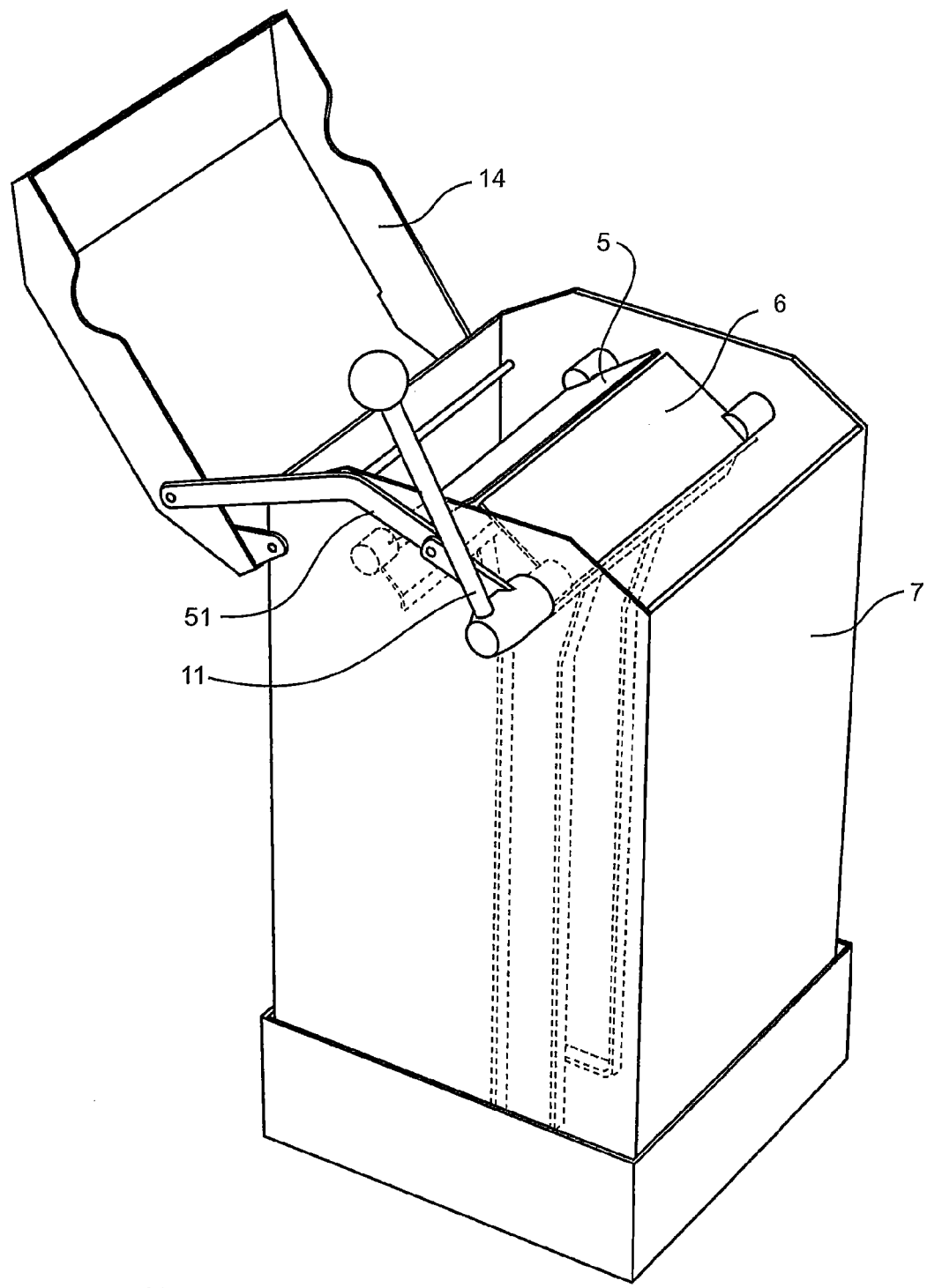
FIG. 10 shows a profile view of a further embodiment of the apparatus with a handle connected with a lid in an open position.
Figure 11:
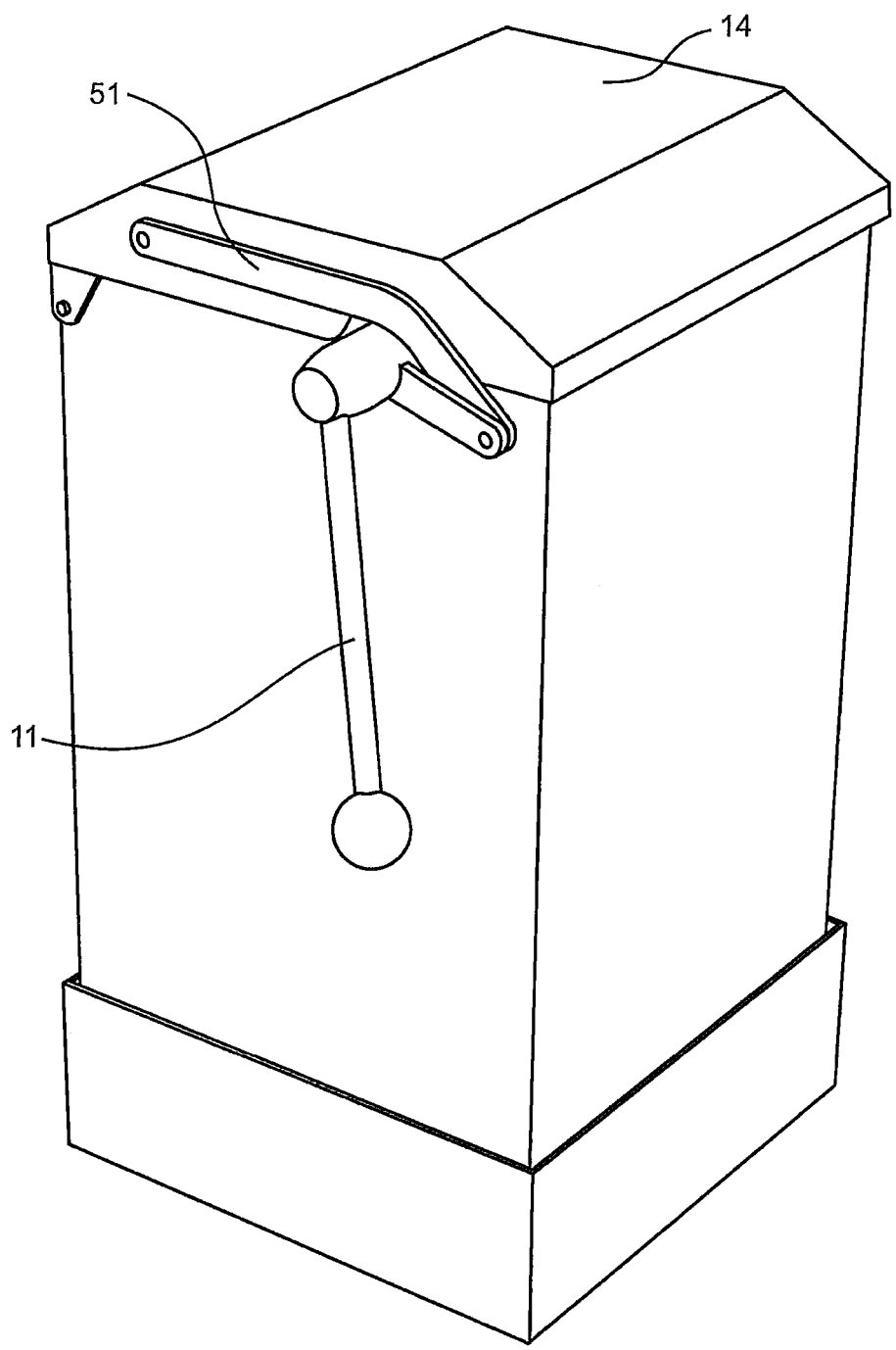
FIG. 11 shows a profile view of the embodiment of FIG. 10 with the lid in the closed position.

FIG. 10 shows a profile view of a further embodiment of the apparatus with the handle 11 connected with the lid 14 in an open position and FIG. 11 shows a profile view of the embodiment of FIG. 10 with the lid 14 in the closed position. In this embodiment, an arm 51 with a point of articulation connects the handle 11 to the lid 14 such that movement of these items occurs in unison. The point of articulation is located proximate the handle end such that the lid at first moves slowly from the open position and then quicker into the closed position with steady movement of the handle 11.

The method of collecting honey from a bee hive using the apparatus 10 is as follows. The device 10 is transported to the location of a bee hive. Hives are often located in remote of rural locations and often require some effort to travel to. The apparatus 10 can be assembled on top of a collection apparatus such as a food grade bucket.

Honey frames are removed from the hive by usual apiculturist methods. The width and height of the particular blades used may be fitted according to the dimensions of the honey frames to be stripped.

A honey frame can be lowered into the apparatus 10 according to any of the embodiments described and one of both blades 5, 6 closed to cut into the honey comb. The honey frame may then be pushed downward such that the blades cut between the honeycomb and the dividing wall 32 of the honey frame 30. The honey frame may be rotated within or externally to the blades such that the blades may reach any of the corners or edges missed by the blades during the first cutting movement. The honeycomb cut from the frame preferably falls into a collection apparatus located below.

When the honeycomb is cut from the honey frame, the frame may be placed back into the hive for the bees to begin rebuilding new honeycomb and honey. The process may be repeated as many times as necessary. A collection apparatus full of honeycomb may be swapped out from under the apparatus 10 and replaced with an empty collection apparatus.

The full collection apparatus is preferably sealed with a lid. The collection apparatus full of honeycomb can be transported to a facility for separating the honey from the honeycomb.

Use of the apparatus 10 means that honey frames with the honeycomb cut from them are not required to be transported to another location for further processing. This advantageously does away with the requirement for another trip to the location of the beehives to replace the empty honey frames. Collection apparatus can easily be transported from the site of the beehive to a processing facility where the honey can be extracted. The collection apparatus can be cleaned in the processing facility and stored until they are required at another time.

Figure 12:
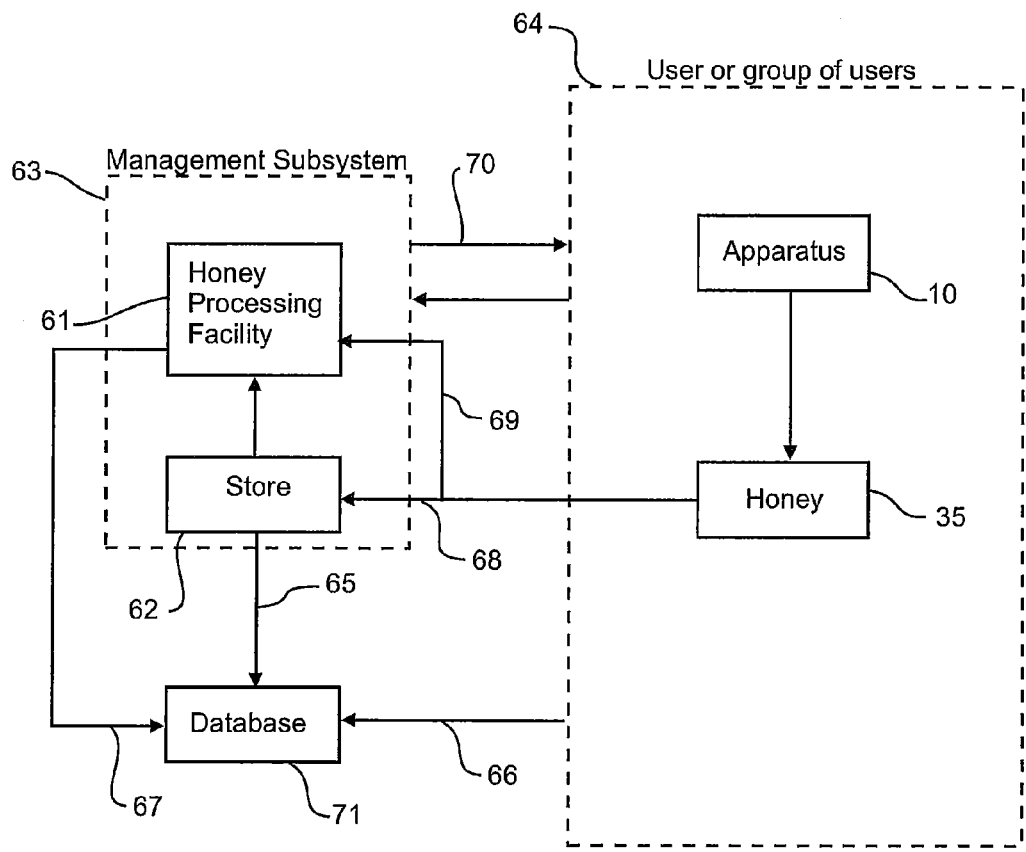
FIG. 12 shows a diagram of methods of use of the above described apparatus as part of a wider system for managing the collection of honey.

FIG. 12 shows a diagram an exemplary system for managing use of the above described apparatus 10 and the collection of honey. In this example, the apparatus 10 is provided to a user or group of users 64 for which they will use to collect honey from beehives.

A management subsystem 63 arranges provision 70 of the apparatus 10 to the user or group of users 64. In exchange for use of the apparatus 10, the user or group of users may lease the apparatus, provide remuneration, be sold the apparatus and/or be provided with an apparatus under supervision. In some embodiments the user or group of users 64 comprises a club or organisation with membership. The group of users could be spread across different regions, for example, where the users are bee keepers responsible for managing hives across various locations.

In the system of FIG. 12 the users or group of users 64 make use of the apparatus 10 and collect honey 35 from beehives. The collected honey is then returned to a honey processing facility 61 directly 69 or transported 68 to a temporary storage area 62. The storage area may be managed by the management subsystem 63 or by a third party such as a transportation or logistics facilitator before eventually being transported to the honey processing facility 61. Once the honey is received at the honey processing facility it can be processed for use, storage, packaging or otherwise prepared for commercialisation.

In return for receiving honey from the user or group of users, the management subsystem provides to the user or group of users, and/or the transportation or logistics facilitator, remuneration for collecting honey and/or remuneration for transportation of the collected honey. In some embodiments the remuneration is merely the use of the apparatus 10. In some embodiments the honey is sold and the financial gain from the sales is used to remunerate the users or groups of users.

In some embodiments, a database 71 is provided to maintain records of honey collected and/or being transported and/or apparatus 10 in use. For example, the database 71 may receive information 67 pertaining to honey received and/or being processed at the honey processing facility 61. The database may further receive information 65 pertaining to honey being stored at the storage area 62. The database may further receive 66 information from the user or group of user 64. In some embodiments the database is configured to store information pertaining to one or more of, for example: a quantity of bee hives accessible by a user or group of users, identification of the user of the apparatus 10, a quantity of honey collected by any user or group of users, the location where the apparatus 10 has been used, the time spent with the apparatus 10, and/or the time when the honey was collected.

In other exemplary uses, one or more apparatus 10 is provided to each of a plurality of users operating beehives, receiving, from two or more of the users, honey collected from their beehives using the apparatus the honey at one or more bulk honey facilities. Upon reception the honey is then stored, processed, packaged, distributed, and/or traded at one or more of the bulk honey facilities and/or otherwise dealt with.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope of the invention as set out by the claims.

The invention claimed is:

1. A portable apparatus for cutting and collecting a honeycomb containing honey from a honey frame, comprising:
   a frame having an opening for inserting into the portable apparatus a honey frame having a rigid dividing wall,
   a first blade supported by the frame, and wherein the first blade is adapted to pivot, in use, between a first position where the honey frame can be inserted into the opening and a second position where the first blade, in use, will cut the honeycomb at or close to the dividing wall such that the honeycomb and the honey contained therein are stripped and removed from the dividing wall and the honey frame, and
   wherein in the second position, the first blade is angled to provide a sloped surface such that after being cut, the honeycomb and the honey contained therein slide across and along the sloped surface and are guided away from the dividing wall such that the honeycomb and the honey contained therein fall into and are collected in a container, whereby the honeycomb can be transported to a facility where the honey is separated from the honeycomb.

2. The apparatus as claimed in claim 1, wherein the apparatus further comprises a support or supporting wall supported by the frame and opposing the first blade, the support or supporting wall adapted to press against the honeycomb or honey frame when the first blade is in the second position.

3. The apparatus as claimed in claim 1, further comprising a second blade supported by the frame and opposed to the first blade, wherein at least the first blade is adapted to pivot relative to the second blade between the first position where the honey frame can be inserted into a gap between the first and second blades, and the second position with the first and second blades closed onto or near the dividing wall, so that in use, the first and second blades cut the honeycomb at or close to respective sides of the dividing wall such that the honeycomb and the honey contained therein are stripped and removed from the dividing wall and the honey frame.

4. The apparatus as claimed in claim 1, wherein the frame comprises an enclosure and side walls, the enclosure adapted to be fastened to the side walls by one or more fasteners.

5. The apparatus as claimed in claim 4, wherein at least one of the side walls or enclosure is adapted to engage with container.

6. The apparatus as claimed in claim 1, wherein the lower portion of the frame is profiled to allow engagement with the container.

7. The apparatus as claimed in claim 1, wherein the first blade is heated by any one of an electrical element or a hot fluid.

8. The apparatus as claimed in claim 1, wherein the first blade is coupled, directly or indirectly, to a handle adapted to provide leverage to the first blade.

9. The apparatus as claimed in claim 8, wherein the apparatus further comprises a biasing device connecting the handle to the frame, the biasing device configured to bias the handle to an inward or cutting position.

10. The apparatus as claimed in claim 8, wherein the apparatus further comprises a coupling arm connecting a lid adapted to substantially cover the opening to the handle, wherein the coupling arm has a point of articulation.

11. The apparatus as claimed in claim 1, wherein the apparatus further comprises a lid adapted to substantially cover the opening.

12. A portable apparatus for cutting and collecting a honeycomb containing honey from a honey frame, comprising:
   a frame having an opening for inserting into the portable apparatus a honey frame having a rigid dividing wall,
   first and second opposed blades supported by the frame, and wherein the first and second blades are adapted to pivot, in use, between a first position where the honey frame can be inserted into an opening between the blades and a second position where the first and second blades, in use, will cut the honeycomb at or close to the dividing wall such that the honeycomb and the honey contained therein are stripped and removed from the dividing wall and the honey frame, and wherein in the second position, the first and/or second blades are angled to provide sloped surfaces such that after being stripped from the dividing wall, the honeycomb and the honey contained therein slide across and along the sloped surfaces and are guided away from the dividing wall such that the honeycomb and the honey contained therein fall into and are collected by a container, whereby the honeycomb can be transported to a facility where the honey is separated from the honeycomb.

\* \* \* \* \*